United States Patent
Chapman

(10) Patent No.: US 8,534,383 B2
(45) Date of Patent: Sep. 17, 2013

(54) VISCOSITY REDUCER FOR WATER-BASED MUDS

(75) Inventor: John W. Chapman, Stonehaven (GB)

(73) Assignee: M-I Drilling Fluids UK Limited, Aberdeen, Scotland (GB)

( * ) Notice: Subject to any disclaimer, the term of this patent is extended or adjusted under 35 U.S.C. 154(b) by 228 days.

(21) Appl. No.: 12/921,195

(22) PCT Filed: Mar. 11, 2009

(86) PCT No.: PCT/US2009/036799
§ 371 (c)(1),
(2), (4) Date: Sep. 7, 2010

(87) PCT Pub. No.: WO2009/114611
PCT Pub. Date: Sep. 17, 2009

(65) Prior Publication Data
US 2011/0042078 A1    Feb. 24, 2011

Related U.S. Application Data

(60) Provisional application No. 61/036,316, filed on Mar. 13, 2008.

(51) Int. Cl.
*E21B 21/06*    (2006.01)
*E21B 43/22*    (2006.01)

(52) U.S. Cl.
USPC ............ 175/72; 166/300; 166/302; 175/64; 175/70

(58) Field of Classification Search
None
See application file for complete search history.

(56) References Cited

U.S. PATENT DOCUMENTS

| 3,635,822 A | * | 1/1972 | Douglass | ................. 175/66 |
| 5,447,199 A | | 9/1995 | Dawson et al. | |
| 2003/0114314 A1 | | 6/2003 | Ballard et al. | |
| 2003/0236171 A1 | * | 12/2003 | Nguyen et al. | ............. 507/100 |

FOREIGN PATENT DOCUMENTS

EP    1900902 A1    3/2008

OTHER PUBLICATIONS

International Search Report and Written Opinion, mailed Oct. 19, 2009, for PCT/US2009/036799.
Examination Report issued in EP09720427.5 on Nov. 21, 2012, 7 pages.

* cited by examiner

*Primary Examiner* — Zakiya W Bates
(74) *Attorney, Agent, or Firm* — Sara Hinkley; David J. Smith

(57) ABSTRACT

A method of reducing the viscosity of a water-based drilling fluid without requiring dilution. The method of reducing the viscosity of a water-based drilling fluid, includes: providing a water-based drilling fluid containing a peroxide degradable polymer and a weighting agent, adding a viscosity reducing additive containing an inorganic peroxide to the water-based drilling fluid while maintaining the pH of the water-based drilling fluid at a pH greater than about 8, circulating the water-based drilling fluid having a pH greater than about 8 through a wellbore, and heating the circulating water-based drilling fluid to a temperature of at least about 150° F. so as to activate the inorganic peroxide to degrade the peroxide degradable polymer.

16 Claims, 4 Drawing Sheets

VISCOSITY REDUCER FOR WATER-BASED MUDS

BACKGROUND OF INVENTION

In rotary drilling of subterranean wells, a drilling fluid having the desired fluid properties travels through the drill pipe, out a nozzle at the drill bit, and returns to the surface through an annular portion of the wellbore. Drilling fluids are carefully formulated to impart numerous functions and possess fluid characteristics that optimize production while not presenting a risk to personnel, drilling equipment, or the environment. A drilling fluid should circulate throughout the well and carry cuttings from beneath the bit, transport the cuttings up the annulus, and allow their separation at the surface. At the same time, the drilling fluid is expected to lubricate, cool and clean the drill bit, reduce friction between the drill string and the sides of the borehole, maintain stability in the borehole's encased sections, and prevent the unwanted influx of formation fluids from permeable rock formations penetrated by the bit.

Water-based drilling fluids, i.e., water-based muds, typically contain synthetic and natural polymers to establish the desired rheological properties of the drilling fluid. The drilling fluid is preferably formulated to exhibit a rheology that both enhances the suspension characteristics of the fluid for the removal of drill cuttings and also minimizes the pressure drop in the drillpipe. While the viscosity of the drilling fluid at high shear rates affects the pressure drop in the drillpipe and annulus, the viscosity of the drilling fluid at low shear rates influences the suspending and solids (i.e., weighting agents, drill cuttings) carrying capacity of the drilling fluid. Drilling fluid rheology at high shear rates is commonly referred to as the plastic viscosity (PV), or high shear rate viscosity, as defined by the Bingham plastic model ($\tau=PV(\gamma)+YP$, wherein $\tau$ is the shear stress [force/area; lb/100 ft$^2$] applied to the drilling fluid, and $\gamma$ is the shear rate [time$^{-1}$]). Rheology at low shear rates is often characterized by the yield point (YP), also referred to as the low shear rate viscosity, as defined by the Bingham model. The Bingham model is widely employed to describe fluid flow in the drilling fluids industry.

It is important that the driller or operator of subterranean wells be able to control the rheological properties of water-based drilling fluids during the use of these fluids in drilling operations. In one aspect, the pH of water-based drilling fluids is typically maintained in the range from about 7.5 to about 12, and preferably in the range from about 9 to about 11, in order to retard uncontrolled polymer degradation and help maintain the rheological properties of the drilling fluid. The pH can be adjusted by methods known to those skilled in the art, including the addition of bases to the drilling fluid. Suitable bases include potassium hydroxide, sodium hydroxide, sodium carbonate (soda ash), magnesium oxide, calcium hydroxide and zinc oxide. In another aspect, sometimes the operator needs to reduce the viscosity of the drilling fluid in order to allow, for example, casing to be run or to bring the drilling fluid back into specification after a build-up of drill solids or weighting-up has occurred. Normally the reduction in viscosity of water-based drilling fluids is achieved by dilution with water which modifies the relative concentrations of mud components and thus subsequently requires post-dilution treatment of the drilling fluid and disposal of excess fluid. Post-dilution treatment of drilling fluids, particularly high performance water-based muds (HPWBMs) containing a number of additives, can significantly increase the cost to the operator who desires to reduce the viscosity of the drilling fluid.

It would be an improvement in the art to provide an alternative method to reduce the viscosity of water-based muds in a controlled manner without requiring dilution.

SUMMARY

The invention is generally directed to a method of reducing the viscosity of a water-based drilling fluid. The method of the present invention includes incorporating a viscosity reducing additive into the drilling fluid to enable an operator to reduce the viscosity of the drilling fluid in a controlled manner without requiring dilution. In one embodiment, the invention provides a method of reducing the viscosity of a water-based drilling fluid, including: providing a water-based drilling fluid containing a peroxide degradable polymer and a weighting agent, adding a viscosity reducing additive containing an inorganic peroxide to the water-based drilling fluid while maintaining the pH of the water-based drilling fluid at a pH greater than about 8, circulating the water-based drilling fluid having a pH greater than about 8 through a wellbore, and heating the circulating water-based drilling fluid to a temperature of at least about 150° F. so as to activate the inorganic peroxide to degrade the peroxide degradable polymer.

In another embodiment, the invention provides a method of reducing the viscosity of a water-based drilling fluid, including: providing a water-based drilling fluid comprising a peroxide degradable polymer and a weighting agent, adding a viscosity reducing additive containing calcium peroxide to the water-based drilling fluid while maintaining the pH of the water-based drilling fluid at a pH greater than about 8, circulating the water-based drilling fluid having a pH greater than about 8 through a wellbore, and heating the circulating water-based drilling fluid to a temperature in the range from about 150° F. to about 250° F. so as to activate the calcium peroxide to degrade the peroxide degradable polymer.

In still another embodiment, the invention provides a method of reducing the viscosity of a water-based drilling fluid, comprising: providing a water-based drilling fluid containing a peroxide degradable polymer and a weighting agent, adding a viscosity reducing additive comprising calcium peroxide, calcium hydroxide and calcium carbonate to the water-based drilling fluid while maintaining the pH of the water-based drilling fluid at a pH in the range from about 9 to about 11, circulating the water-based drilling fluid having a pH in the range from about 9 to about 11 through a wellbore, and heating the circulating water-based drilling fluid to a temperature in the range from about 150° F. to about 200° F. so as to activate the calcium peroxide to degrade the peroxide degradable polymer.

These and other features are more fully set forth in the following description of preferred or illustrative embodiments of the disclosed and claimed subject matter.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
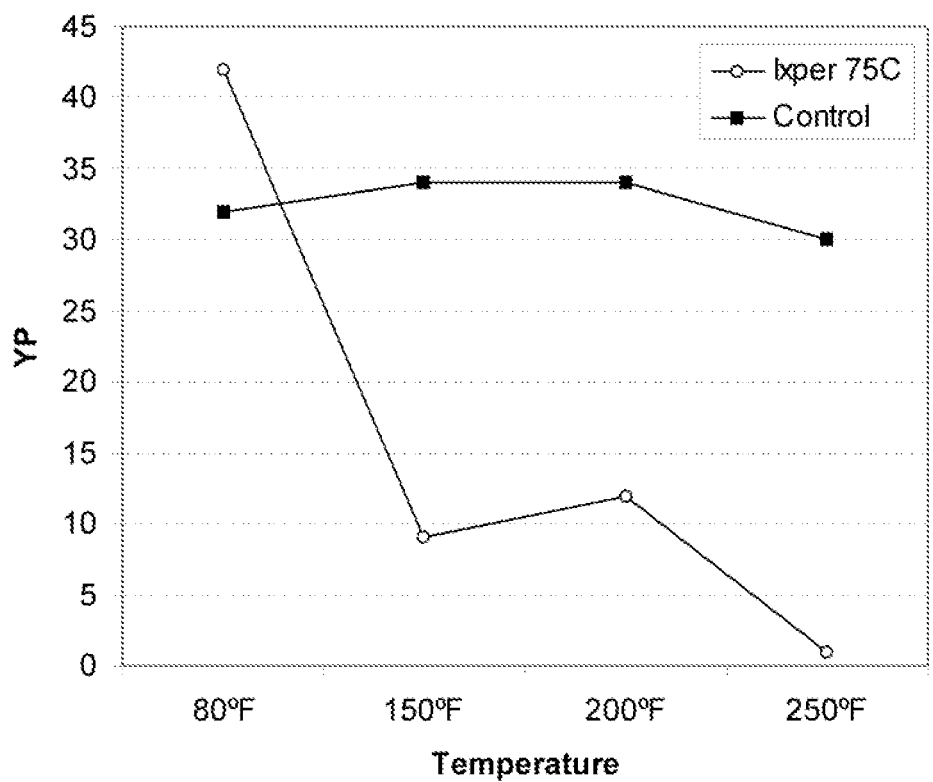
FIG. 1 is a graph of the effect of temperature on the YP of mud containing IXPER® 75C.

The processes, methods and compositions described in this disclosure are used to form a drilling fluid having a viscosity reducing additive that may be activated in a controllable manner so as to reduce the viscosity of the drilling fluid. After the drilling fluid is weighted-up during drilling operations, an operator may want to decrease the viscosity of the weighted-up drilling fluid to a viscosity within specification. Incorporating the viscosity reducing agent within the drilling fluid as described herein enables the operator to controllably activate the viscosity reducing additive within the fluid to reduce the fluid viscosity by a desired amount. This method advantageously avoids the more expensive alternative of dilution, particularly with respect to HPWBMs.

Water-based drilling fluids are principally composed of an aqueous solution as the continuous phase. The aqueous-based continuous phase is generally selected from: fresh water, seawater, natural brine solutions, brines formed by dissolving suitable salts in water, mixtures of water and water-soluble organic compounds, and combinations of these and similar compounds that should be known to one of skill in the art. Suitable salts include chloride, bromide, acetate and formate salts of potassium, sodium, calcium, magnesium, zinc, and cesium. The amount of the aqueous-based continuous phase should be sufficient to form a water-based drilling fluid. This amount may range from nearly 100 vol. % of the drilling fluid to less than 30 vol. % of the drilling fluid. Preferably, the amount of the aqueous-based continuous phase is in the range from about 90 vol. % to about 40 vol. % of the drilling fluid.

A variety of components or additives may be added to the water-based drilling fluid in order to achieve different desired fluid properties. Water-based drilling fluids are normally formulated to include one or more viscosifying agents to impart desired rheological properties to the fluid. In general, viscosifying agents are typically natural and synthetic polymers such as polysaccharides and polysaccharide derivatives. Examples of suitable viscosifying agents include starches, scleroglucans, guar gums, polyacrylates, xanthan gum, as well as combinations of these compounds. It may also be desirable to add components to the drilling fluid to help control fluid loss. Fluid loss additives such as starches, celluloses, and other polysaccharides may be added to the water-based drilling fluid to keep the drilling fluid from entering the subterranean formation while allowing the drilling fluid to be maintained at a pressure greater than that of the formation. Examples of suitable fluid loss additives include polyanionic cellulosic polymer (PAC) such as polyanionic carboxymethylcellulose, chemically modified starches, mixtures of these and the like.

Water-based drilling fluids typically also contain a weight material in order to provide sufficient density to the fluid for drilling purposes and to prevent kick-backs and blowouts during drilling operations. Weighting materials for use in the present invention may be generally selected from any type of weighting materials used in water-based drilling fluids. Suitable weight materials include barite, hermatite, iron oxide, calcium carbonate, alkali halides, alkaline earth halides, magnesium carbonate, zinc halides, zinc formates, zinc acetates, cesium halides, cesium formates, cesium acetates, and other known organic and inorganic salts, mixtures and combinations of these compounds.

The drilling fluid of the present invention may also be formulated to include materials generically referred to as thinners. Typically thinners are added to reduce flow resistance, control gelation tendencies, counteract the effects of salts, and stabilize mud properties. Suitable thinners include lignosulfonates, modified lignosulfonates, polyphosphates, tannins, and low molecular weight polyacrylates and polyanionic celluloses.

In addition to the drilling fluid components noted above, the water-based drilling fluids of the present invention may also include shale inhibition agents such as glycols and polyamines. Examples of suitable shale inhibition agents include glycol ether, for example GLYDRIL MC a product commercially available from M-I L.L.C., Houston, Tex., and partially-hydrolyzed polyacrylamide (PHPA) a product commercially available on the market. Other additives that are frequently present in water-based drilling fluids of the present invention include shale encapsulation agents, lubricants, penetration rate enhancers, defoamers, corrosion inhibitors, and loss circulation products. Such additives should be known to one of ordinary skill in the art of formulating water-based drilling fluids.

Water-based drilling fluids (i.e., muds) formulated to contain a wide variety of additives may be utilized in the present invention. Water-based muds including glycols for shale inhibition are commonly referred to as glycol-type inhibitive water-based muds. In one example, the basic composition of a glycol-type inhibitive water-based mud that may be utilized in the present invention is shown in Table 1. The drilling fluid composition includes potassium chloride brine, a glycol ether shale inhibitor product GLYDRIL MC, xanthan gum viscosifier products DUO-TEC™ NS and DUO-VIS® available from M-I L.L.C., Houston, Tex., POLYPAC® ELV a polyanionic cellulose fluid loss additive product also commercially available from M-I Houston, Tex., a fine barite weighting agent, and soda ash for alkalinity. Another example of a suitable glycol-typed inhibitive water-based mud is the drilling fluid GLYDRIL, a product commercially available from M-I L.L.C., Houston, Tex. Similarly, suitable water-based muds containing PHPA for shale inhibition are commonly referred to as PHPA-type inhibitive water-based muds. Suitable water-based muds that contain additional additives, for example a plurality of shale inhibition additives, are commonly referred to as HPWBMs. One example of a suitable HPWBM is ULTRADRIL™ a drilling fluid commercially available from M-I L.L.C., Houston, Tex.

TABLE 1

| Typical components of a glycol-type inhibitive water-based drilling fluid | |
|---|---|
| Base Mud Formulation | Concentration* [g/lab bbl] |
| Brine (KCl) | 300 |
| GLYDRIL MC | 25 |
| DUO-TEC ™ NS and DUO-VIS ® | 1.5 |
| POLYPAC ® ELV | 5 |
| Barite (API) | 170 |
| Soda Ash | Adjusted to pH ~10 |
| Lime | optional |

*concentrations listed are for illustrative purposes only

The water-based drilling fluids of the present invention also include a viscosity reducing additive that upon thermal activation reduces the viscosity of the drilling fluid. The viscosity reducing additive is a solid inorganic peroxide, and preferably an inorganic peroxide that contains calcium peroxide. The addition of the viscosity reducing additive containing calcium peroxide to water-based drilling fluid provides superior performance in decreasing the viscosity of the drilling fluid as compared to other oxidizers, as illustrated in Example 1 below. Upon activation, the viscosity reducing additive degrades the peroxide degradable polymers in the drilling fluid via an oxidative process. The peroxide degradable polymers normally present in the drilling fluid include viscosifiers and fluid loss additives such as xanthan gum, polysaccharides, starches, and PAC. Furthermore, the viscosity reducing additive is generally insoluble in water prior to activation. The insolubility aids in minimizing oxidation (i.e., degradation) of the peroxide degradable polymers (e.g., PAC) in the drilling fluid until the viscosity reducing additive is intentionally activated.

The concentration of the viscosity reducing additive in the drilling fluid is essentially any effective concentration that upon activation degrades the peroxide degradable polymers in the drilling fluid such that a decrease in the drilling fluid viscosity is attained. In general, the amount of drilling fluid viscosity reduction increases with increasing concentration of the viscosity reducing additive present in the drilling fluid. Typically, a suitable concentration of the viscosity reducing additive is in the range from about 0.5 ppb to about 5 ppb of drilling fluid. For many water-based drilling fluid compositions, an effective concentration of the viscosity reducing additive is in the range from about 1.5 ppb to about 3.5 ppb of the drilling fluid. The viscosity reducing additive is preferably added to the mud (i.e., drilling fluid) when a reduction in the drilling fluid's viscosity is needed. Upon addition of the viscosity reducing additive as required during drilling operations, the viscosity reducing additive is effective in reducing the drilling fluid's viscosity within about one circulation of the fluid around the drill bit. However, it should be noted that the viscosity reducing additive may be added to the mud prior to the need for a reduction in viscosity arises. Introducing the viscosity reducing additive into the drilling fluid may be accomplished by dispersing the additive directly into the whole mud, as previously mentioned, or it can be dispersed into one of the mud's components (e.g., the seawater component) prior to combining that component with the remaining components of the mud.

The viscosity reducing additive in water-based drilling fluids of the present invention is intentionally activated by increasing the temperature of the drilling fluid to a temperature higher than the minimum activation temperature of the additive. Determination of the minimum activation temperature of the viscosity reducing additive as a component of a water-based drilling fluid is illustrated below in Example 2. The presence of the viscosity reducing additive in water-based drilling fluids advantageously enables an operator to controllably reduce the viscosity of the drilling fluid by intentionally activating the viscosity reducing additive therein. In addition, the operator may control the amount of degradation (i.e., viscosity reduction) by adding only an effective concentration of the viscosity reducing additive as required to achieve the desired viscosity reduction. The need to reduce the drilling fluid viscosity may arise on occasions when, for example, casing needs to be run or when the drilling fluid becomes weighted-up during drilling operations and the viscosity exceeds the rheological specifications of the fluid.

Prior to reaching the minimum activation temperature, the pH of the drilling fluid is maintained at pH values greater than about 9 in order to retard the process of polymer degradation. Preferably the pH of the drilling fluid is maintained in the range from about 9.5 to about 11 in order to ensure the viscosity reducing additive has minimal degradative effect on the viscosity of the drilling fluid prior to activation. At pH values less than 8, the drilling fluid becomes more acidic and oxidation is promoted. The acidic environment tends to activate the peroxide at temperatures lower than the minimum activation temperature and thus result in the undesirable release and loss of the viscosity reducing additive and its ineffective consumption. Therefore, to prevent early or uncontrolled activation of the viscosity reducing additive, the pH is preferably maintained at a value greater than about 9 prior to thermal activation of the viscosity reducing additive.

General Information Relevant to the Examples

These tests were conducted in accordance with the procedures in API Bulletin RP 13B-2, 1990. The following abbreviations are sometimes used in describing the results of experimentation.

"PV" is plastic viscosity which is one variable used in the calculation of viscosity characteristics of a drilling fluid, measured in centipoises [cP] units.

"VP" is yield point, which is another variable used in the calculation of viscosity characteristics of drilling fluids, measured in pounds per 100 square feet [lb/100 ft$^2$].

"6-rpm" & "3-rpm" are dial readings on the Fann 35 Viscometer that indicate the viscosity of the drilling fluid at these low shear rates [lb/100 ft$^2$].

"FL" is a measure of the fluid loss at room temperature. A measure of the ease of filtering a drilling fluid through a filter paper at 100 psi differential pressure [ml/30 min.].

Example 1

Performance of Different Oxidizers

In order to compare the performance of different oxidizers as potential viscosity reducing additives, mud samples were prepared by adding 5.0 ppb of each of the oxidizers shown in Table 2 to "field" GLYDRIL mud (containing over 30 ppb low gravity drill solids) that has been weighted up with 4 ppg barite. For comparison purposes, no oxidizer was added to the control mud sample. Rheological characteristics of the mud samples were measured after heat aging by hot rolling the samples at 200° F. for about 16 hours. The rheology data for each of the mud samples shown in Table 2 were measured using a Fann 35 Viscometer.

TABLE 2

Comparison of various oxidizers on the rheology of 4 ppg weighted-up field GLYDRIL mud after hot rolling at 200° F. for 16 hours.

| Oxidizer chemical type (Product) | PV [cP] | YP [lb/100 ft$^2$] | FL [ml] |
|---|---|---|---|
| Control | 33 | 42 | 5.0 |
| Calcium peroxide (IXPER ® 75C) | 14 | 10 | 88.0 |
| Magnesium peroxide (IXPER ® 35M) | 36 | 74 | 4.5 |
| Potassium persulphate* | 29 | 34 | 7.2 |
| Sodium hypochlorite* [6-14% active Cl] | 29 | 44 | 4.8 |
| Sodium percarbonate (Oxyclean ™) | 31 | 37 | 4.2 |
| Hydrogen peroxide* [6 vol. %] | 31 | 42 | 4.4 |

*laboratory grade

As compared to the control sample (i.e., base mud) after hot rolling, the mud sample containing calcium peroxide as the viscosity reducing additive was unique in demonstrating a large reduction in the overall rheology of the mud with a decrease in PV of 58% and a decrease in YP of 76%. The samples containing potassium persulphate and sodium percarbonate also showed a small reduction in both PV and YP. The other oxidizers demonstrated little or no viscosity reduction relative to the control. Furthermore, both calcium peroxide and potassium persulphate mud samples exhibited an increase in fluid loss. The large increase in fluid loss of calcium peroxide indicates substantial polymer degradation, whereas the potassium persulphate mud sample underwent polymer degradation to a much lesser degree. In accordance with these test results, calcium peroxide is particularly preferred as the viscosity reducing oxidizer for water-based drilling fluids, however other oxidizers such as potassium persulphate, and sodium percarbonate may be used to provide a measurable reduction in drilling fluid viscosity.

Example 2

Determination of the Minimum Activation Temperature

The effect of temperature on the viscosity of weighted-up "field" GLYDRIL mud containing the viscosity reducing additive calcium peroxide is illustrated in FIG. 1. The "field" GLYDRIL mud containing over 30 ppb low gravity drill solids was weighted up with 4 ppg barite. As the source of calcium peroxide, 3 ppb of IXPER® 75C was added to the mud samples as the viscosity reducing additive. IXPER® 75C, a product commercially available from Solvay Chemicals, Brussels, Belgium, is a powder that contains at least 75 wt. % calcium peroxide with the balance of the ingredients ranging from about 10 wt. % to about 25 wt. % of calcium hydroxide and/or calcium carbonate. The mud samples containing 3.0 ppb IXPER® 75C and control mud samples without IXPER® 75C were prepared and hot rolled at four different temperatures 80° F., 150° F., 200° F., and 250° F. The samples were heat aged for 16 hours at each of the hot rolling temperatures. FIG. 1 shows the change in the rheological parameter yield point (YP) of the samples as a function of hot-rolling temperature. Mud samples containing IXPER® 75C show a substantial reduction in YP from about 42 lb/100 ft$^2$ at ambient temperature (about 80° F.) to a value less than about 12 lb/100 ft$^2$ at temperatures equal to or greater than 150° F. In comparison, there is little effect of temperature on the YP of the control samples which range in values from about 30 to 35 lb/100 ft$^2$. These results indicate that the viscosity reducing additive IXPER® 75C in the "field" GLYDRIL mud tested requires a minimum activation temperature of about 150° F. (66° C.) before a substantial reduction in drilling fluid viscosity is observed.

Example 3

Drilling Fluid Viscosity Reduction Performance

Figure 2:
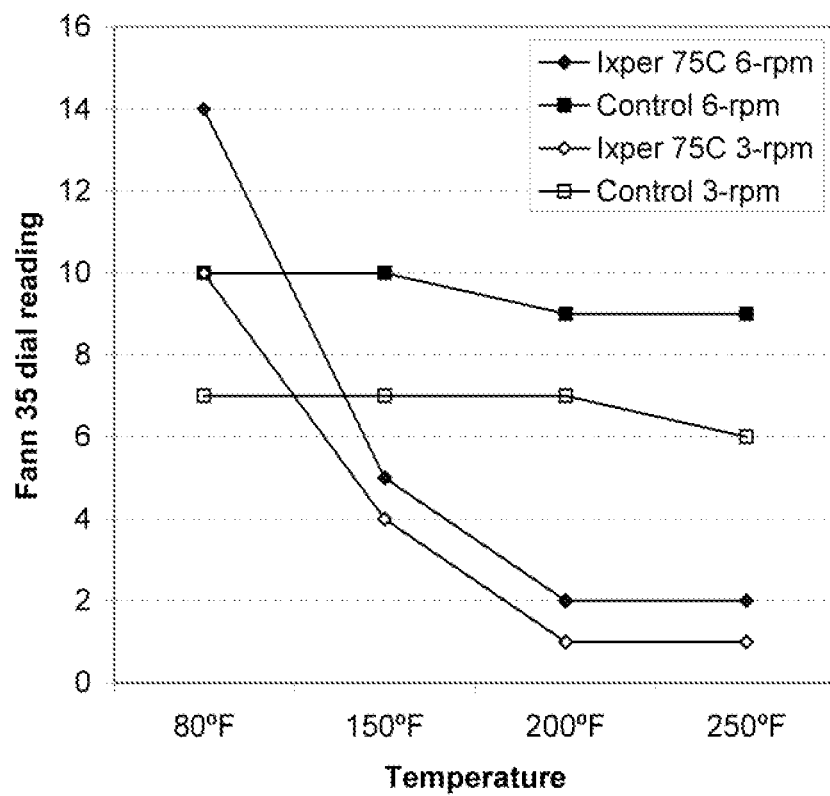
FIG. 2 is a graph of the effect of temperature on 3-rpm and 6-rpm of mud containing IXPER® 75C.

The effect of temperature on the 3-rpm and 6-rpm viscosity of weighted-up "field" GLYDRIL mud containing the viscosity reducing additive IXPER® 75C is illustrated in FIG. 2. The mud samples were prepared in the same manner as described above with respect to Example 2. The mud samples containing 3.0 ppb IXPER® 75C and control mud samples without IXPER® 75C were prepared and hot rolled at four different temperatures 80° F., 150° F., 200° F., and 250° F. for 16 hours. The change in the 3-rpm and 6-rpm Fann readings for the samples is shown in FIG. 2 as a function of hot-rolling temperature. Mud samples containing IXPER® 75C exhibit a substantial reduction in the low shear rheology (LSR) at 150° F. and a further reduction at 200° F. In comparison, there is relatively little effect of temperature on the 3-rpm and 6-rpm readings of the control samples. These results and the results shown above in Example 2, demonstrate that the combination of the presence of the viscosity reducing additive IXPER® 75C as a component of the drilling fluid and heating the drilling fluid to a temperature greater than the minimum activation temperature of about 150° F. allows for a controlled reduction of the drilling fluid's viscosity.

Example 4

Polymer Degradation Performance

Figure 3A:
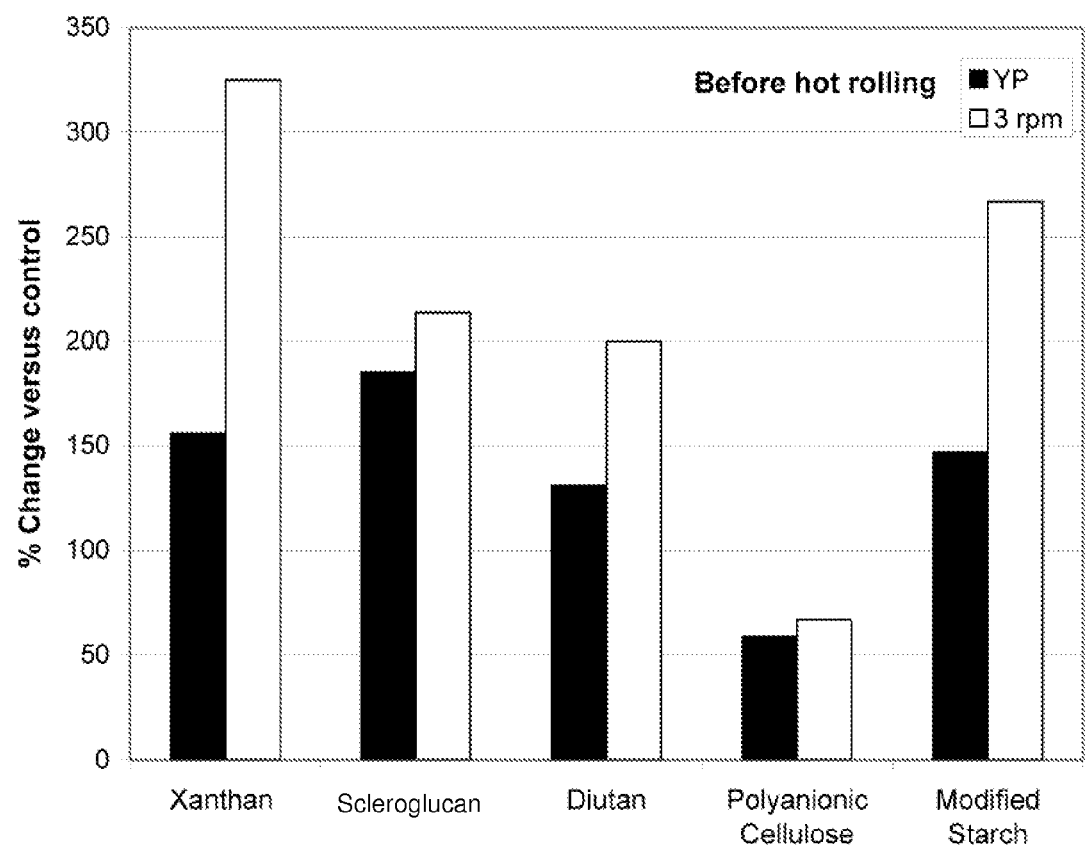
FIG. 3A is a graph of the effect of IXPER® 75C on YP and 3-rpm for different viscosifying and fluid loss polymers before hot rolling.
Figure 3B:
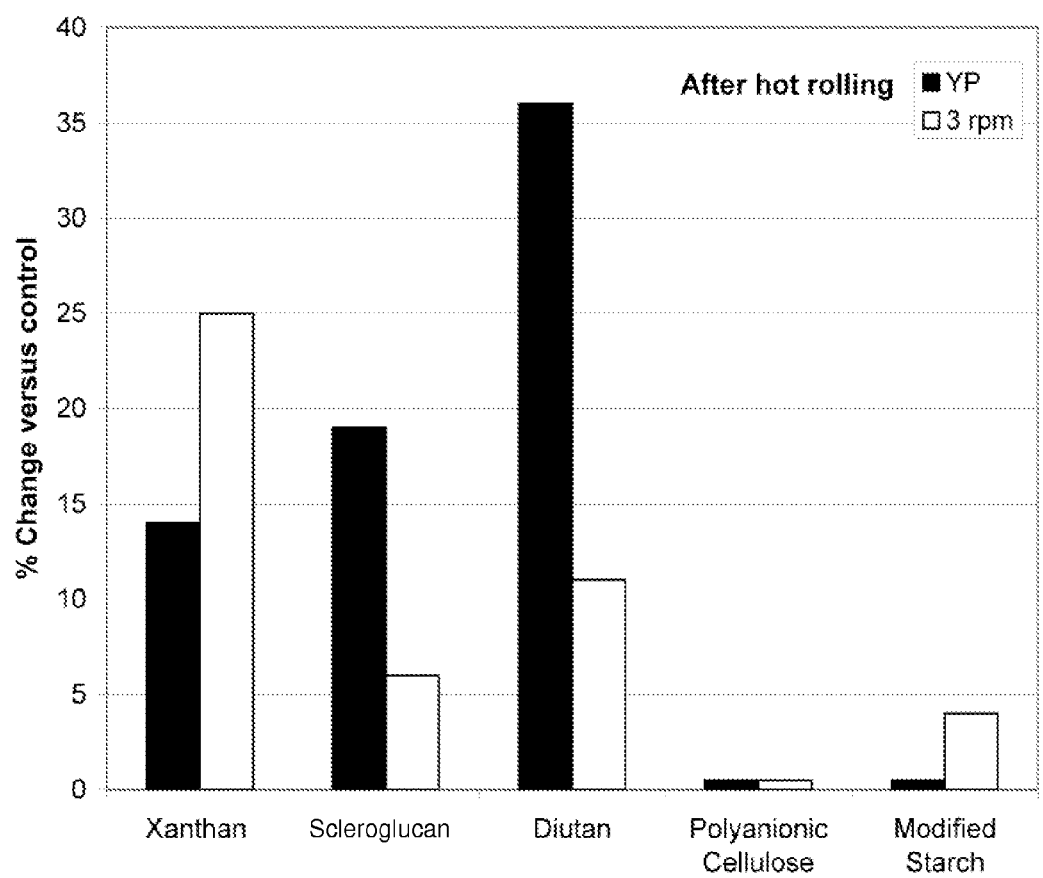
FIG. 3B is a graph of the effect of IXPER® 75C on YP and 3-rpm for different viscosifying and fluid loss polymers after hot rolling.

FIGS. 3A and 3B demonstrate the performance of the viscosity reducing additive (i.e., the applicability of the oxidative process) for polymer degradation of polymer viscosifiers and fluid loss additives commonly used in water-based drilling fluids. Viscosifier samples were prepared by adding 3 ppb of xanthan gum (DUO-VIS®), scleroglucan (Biovis® SR, commercially available on the market), and diutan (Geovis® XT, commercially available on the market) to seawater. Fluid loss samples were prepared by adding 20 ppb of polyanionic cellulose (POLYPAC® ELV) and modified starch (DUAL-FLO®, available from M-I L.L.C., Houston, Tex.) to seawater. The viscosifier samples and the fluid loss samples were allowed to stand overnight (about 16 hours) to allow the full viscosity to develop prior to adding 3.0 ppb IXPER® 75C (predominantly calcium peroxide) as the viscosity reducing additive to each of the samples. For comparison purposes, no viscosity reducing additive was added to the control viscosifier samples and control fluid loss samples. The treated samples (i.e., containing calcium peroxide) and the control samples were allowed to stand for an additional 3 hours at ambient temperature and then initial rheology measurements were made using a Fann 35 Viscometer and plotted in FIG. 3A. FIGS. 3A and 36 show the percentage change in YP and 3-rpm (LSR) measurements of the different samples normalized with respect to their corresponding control samples before and after heat aging at 175° F. for 16 hours, respectively.

Referring to FIG. 3A, the treated xanthan gum viscosifier sample exhibited over 3 times the LSR and 1.5 times the YP of the untreated xanthan gum control sample. The treated scleroglucan sample exhibited a little more than 2 times the LSR and a little less than 2 times the YP as compared to the untreated scleroglucan control sample. The treated diutan sample showed an increase of about 2 times the LSR and about 1.3 times the YP relative to the untreated diutan control sample. The fluid loss modified starch additive also exhibited an increase of about 2.7 times the LSR and 1.5 times the YP of the untreated modified starch control sample. Unlike the other additives, the fluid loss additive PAC exhibited a decrease of about 0.7 times the LSR (i.e., a 30% reduction) and about 0.6 times the YP (i.e., a 40% reduction) of the untreated polyanionic cellulose control sample. The general increase in the other treated samples is likely to be the result of an increase in alkalinity of the samples due to the addition of IXPER® 75C.

After heat aging at 175° F. the treated samples and control samples, rheology measurements of the treated samples exhibited a substantial decrease in bath the LSR and YP measurements, as depicted in FIG. 3B. The heat-aged treated samples exhibited a reduction of about 75%-99% in LSR and a 64%-99% reduction in YP as compared to the corresponding heat-aged untreated control samples. The fluid loss additive samples having a higher concentration of degradable polymer demonstrated proportionately greater reductions in LSR and YP as compared to the viscosifier samples.

The data in FIGS. 3A and 3B indicate that in the presence of the viscosity reducing additive calcium peroxide (e.g., IXPER® 75C), the fluid loss additive PAC undergoes significant degradation under ambient temperature, whereas the other fluid loss additive modified starch and the three viscosifiers require both the presence of calcium peroxide and exposure to a higher temperature (i.e., higher than the minimum activation temperature) for degradation. These results suggest that drilling fluids containing the viscosity reducing additive are preferably formulated to contain a stable fluid loss additive, for example a starch-based fluid loss additive, and a polysaccharide viscosifier in order to enhance control over the viscosity reduction. However, the applicability of the viscosity reducing additive for controlled viscosity reduction is not limited to any particular water-based drilling fluid composition. For example, incorporating the viscosity reducing additive into a drilling fluid containing a less stable fluid loss additive (e.g., PAC) provides controlled degradation when exposed to temperature in excess of the minimum activation temperature. However, it should be noted that any significant PAC degradation at temperatures below the minimum activation temperature may require additional treatment with PAC by occasionally adding PAC to the drilling fluid in order to maintain the fluid loss of the fluid within specification.

While the foregoing is directed to embodiments of the present invention, other and further embodiments of the invention may be devised without departing from the basic scope thereof, and the scope thereof is determined by the claims that follow.

What is claimed is:

1. A method of reducing the viscosity of a water-based drilling fluid, comprising:
    circulating a water-based drilling fluid through a wellbore during drilling operations, wherein the water-based drilling fluid comprises a peroxide degradable polymer and a viscosity reducing agent, wherein the viscosity reducing agent is selected from the group consisting of calcium peroxide, calcium hydroxide, calcium carbonate, and combinations thereof, wherein the water-based drilling fluid has a pH greater than about 8; and
    heating the circulating water-based drilling fluid to a temperature of at least about 150° F. so as to activate the viscosity reducing agent to degrade the peroxide degradable polymer.

2. The method of claim 1, further comprising adding a fluid toss agent to the water-based drilling fluid subsequent to degrading the peroxide degradable polymer during the heating of the circulating water-based drilling fluid.

3. The method of claim 2, wherein the fluid loss agent is selected from a group consisting of starches and polyanionic cellulose.

4. The method of claim 1, wherein the viscosity reducing agent is an inorganic peroxide.

5. The method of claim 4, wherein the inorganic peroxide has a concentration in the range from about 0.5 ppb to about 5 ppb of the water-based drilling fluid.

6. The method of claim 1, wherein the pH of the water-based drilling fluid is a pH in the range from about 9 to about 11.

7. The method of claim 1, wherein the heating of the circulating water-based drilling fluid is to a temperature in the range from about 150° F. to about 250° F.

8. The method of claim 1, wherein the peroxide degradable polymer is a polysaccharide polymer.

9. The method of claim 8, wherein the polysaccharide polymer is selected from the group consisting of xanthan gum, scleroglucan, and diutan.

10. A method of reducing the viscosity of a water-based drilling fluid, comprising:
    circulating a water-based drilling fluid having a pH greater than about 9 through a wellbore during drilling operations, wherein the water based drilling fluid comprises a peroxide degradable polymer and an inactivated viscosity reducing agent, wherein the viscosity reducing agent is selected from the group consisting of calcium peroxide, calcium hydroxide, calcium carbonate, and combinations thereof, and wherein the inactivated viscosity reducing agent comprises an inorganic peroxide;
    activating the viscosity reducing agent; and
    at least partially degrading the peroxide degradable polymer;
wherein the peroxide degradable polymer is a polysaccharide polymer selected from the group consisting of xanthan gum, scleroglucan, and diutan.

11. The method of claim 10, further comprising maintaining the pH of the water-based drilling fluid at a pH greater than about 9.

12. The method of claim 10, further comprising heating the circulating water-based drilling fluid to a temperature in the range from about 150° F. to about 250° F.

13. The method of claim 12, further comprising adding a fluid loss additive to the water-based drilling fluid subsequent to degrading the peroxide degradable polymer during the heating of the circulating water-based drilling fluid.

14. The method of claim 13, wherein the fluid loss additive is selected from a group consisting of starches and polyanionic cellulose.

15. The method of claim 10, wherein the pH the water-based drilling fluid is a pH in the range from about 9 to about 11.

16. The method of claim 10, wherein the calcium peroxide has a concentration in the range from about 1.5 ppb to about 3.5 ppb of the water-based drilling fluid.

* * * * *